US005117633A

United States Patent [19]

Bayer et al.

[11] Patent Number: 5,117,633

[45] Date of Patent: Jun. 2, 1992

[54] PNEUMOHYDRAULIC ACTUATOR

[75] Inventors: Jacob Bayer; Shek M. Cheung, both of Tempe; William F. Ryan, Phoenix, all of Ariz.

[73] Assignee: Allied-Signal Inc., Morris Township, Morris County, N.J.

[21] Appl. No.: 550,609

[22] Filed: Jul. 10, 1990

[51] Int. Cl.[5] F16D 31/02

[52] U.S. Cl. 60/431; 60/473; 91/361; 251/59; 418/206; 417/271

[58] Field of Search 60/327, 431, 432, 433, 60/473, 475, 476, 493; 91/361, 363 R; 251/59; 418/206; 417/271, 405

[56] References Cited

U.S. PATENT DOCUMENTS

| | | | |
|---|---|---|---|
| 1,429,101 | 9/1922 | Ross | 60/476 |
| 1,923,268 | 8/1933 | Jensen | 418/206 |
| 2,467,508 | 4/1949 | Trautman | 60/465 |
| 2,467,509 | 4/1949 | Trautman | 60/329 |
| 2,634,679 | 4/1953 | Kern, Jr. | 418/206 |
| 2,811,834 | 11/1957 | Shafer et al. | 251/59 |
| 2,927,429 | 3/1960 | Carlson | 60/465 |
| 3,135,217 | 6/1964 | Abel | 418/206 |
| 3,263,425 | 8/1966 | Rohde | 60/476 |
| 3,741,688 | 6/1973 | Krosby | 417/372 |
| 3,772,889 | 11/1973 | Mason et al. | 60/473 |
| 3,928,968 | 12/1975 | Becker et al. | 60/428 |
| 3,979,910 | 9/1976 | Levenberger et al. | 60/476 |
| 4,041,704 | 8/1977 | Gygli | 60/473 |
| 4,343,153 | 8/1982 | Kern et al. | 60/476 |
| 4,363,211 | 12/1982 | Robinson et al. | 60/476 |
| 4,412,590 | 11/1983 | Daly | 175/229 |
| 4,611,529 | 9/1986 | Stricker et al. | 417/271 |
| 4,630,441 | 12/1986 | Chamberlain | 60/413 |
| 4,766,728 | 8/1988 | Glomesa | 60/476 |
| 4,799,419 | 1/1989 | Krause | 148/16.6 |
| 4,953,109 | 8/1990 | Burgis | 60/431 |

FOREIGN PATENT DOCUMENTS

| | | | |
|---|---|---|---|
| 2524005 | 12/1976 | Fed. Rep. of Germany | 60/473 |

*Primary Examiner*—Edward K. Look
*Assistant Examiner*—Hoang Nguyen
*Attorney, Agent, or Firm*—Jerry J. Holden; James W. McFarland; Robert A. Walsh

[57] ABSTRACT

A pneumatically driven hydrostatic actuator and a pneumatically driven recirculating hydraulic actuator are provided. Each of these actuators consists of a hydraulic pump fluidly coupled to an actuator. The pump is driven by a low inertia pneumatic motor that extracts pressure energy from pressurized gas and converts it to rotary motion. The pneumatic motor is preferably made from stainless steel A286 so that it can operate using pressurized hydrogen gas. The components of both actuators are in a closely coupled relationship so that they can be arranged in a compact unitary package.

26 Claims, 3 Drawing Sheets

PNEUMOHYDRAULIC ACTUATOR

TECHNICAL FIELD

The present invention generally relates to hydraulic actuators of the type designed to be hydraulically independent from other units and from any main hydraulic systems aboard an aircraft or rocket and particularly, to a pneumohydraulic actuator in which a hydraulic actuator, that is hydraulically independent, is driven by a pneumatic gear motor.

BACKGROUND OF THE INVENTION

Hydraulic actuators of the type designed to be hydraulically independent are well known in the aerospace field and are used for a variety of applications such as to provide vectoring of a rocket's exhaust nozzle or to move control surfaces aboard an aircraft. These actuators generally comprise a hydraulic pump, a linear or rotary actuator that converts the pressure energy of the pumped hydraulic fluid into mechanical energy in the form of linear or rotary motion, and means for driving the hydraulic pump, and generally come in two configurations. The first configuration is the hydrostatic actuator in which the hydraulic pump is in direct fluid communication with the actuator. This system is static because, except for the pumping required to make up for leakage flow in the system, the hydraulic pump only operates when a command to move the actuator is received. The second configuration is the recirculating hydraulic actuator in which a servo-valve is used to control the flow of hydraulic fluid from the hydraulic pump to the actuator and from the actuator to a reservoir. Also, excess flow from the pump is dumped through a relief valve into the reservoir. In this recirculating configuration the hydraulic pump operates continuously, circulating the hydraulic fluid between itself and the reservoir. Only when actuation is required is hydraulic fluid sent to the actuator.

In the hydrostatic configuration, the hydraulic pump is commonly driven by a brushless electric motor. A detailed description of an electrohydrostatic actuator can be found in Chamberlain, U.S. Pat. No. 4,630,441. The use of electric motors to drive the pump has a number of disadvantages. First, the electric motor requires a turbogenerator and circuitry to supply it with adequate electric current. The use of a turbogenerator and circuitry not only adds weight and electronic noise to the vehicle but also reduces the reliability of the system by adding additional failure modes associated with these components. Furthermore, due to size and weight constraints imposed for aircraft and rocket applications, these electrically driven actuators have been limited to outputs of about 45 horsepower. However, there are some applications on airplanes and rockets that require outputs greater than what electrically driven configurations can provide.

Some vehicles have a readily available source of pressurized gas. In these cases, high pressure ratio, impulse type turbine wheels have been used to drive the hydraulic pump on a recirculating configuration. Pressurized gas is bled from the vehicle's gas supply and expanded across the turbine wheel which converts the pressure energy of the gas into rotary motion that drives the hydraulic pump. This configuration is capable of generating up to about 100 horsepower. A disadvantage to using these turbine wheels is their high inertia. Because of their high inertia, the turbine wheels are very slow in accelerating to operating speed. In modern aircraft and rockets, actuators must be able to respond quickly. As a result, in order to meet this quick response time the turbine wheel must be kept running at full operating speed even when no actuation is required. This constant running generates large amounts of heat which requires an elaborate cooling mechanism to dissipate. Also, because the turbines must run continuously, they cannot be used with hydrostatic systems.

Therefore, where pressurized gas is available, there is a need for a hydraulic actuator that could be driven using the pressurized gas and also, could generate sufficient horsepower, satisfy the fast response times required of the actuator, and not generate large amounts of heat during those periods in which actuation is not required. Further, the hydraulic actuator should be packaged in a unitary structure so that it can be mounted in tight spaces aboard the rocket or aircraft and mounted near the rocket or aircraft member that is to be actuated.

SUMMARY OF THE INVENTION

An object of the present invention is to provide a hydraulic actuator of the type that is hydraulically independent that can be driven using available high pressure gas aboard a vehicle.

Another object of the present invention is to provide a pneumatic means for driving a hydraulic actuator that can accelerate rapidly to operating speed and satisfy the quick response time required of actuators on rockets and aircraft.

Yet another object of the present invention is to provide a pneumatic means for driving a hydraulic actuator that does not generate large amounts of heat when actuation is not required.

Yet still another object of the present invention is to provide a pneumatically driven hydraulic actuator having closely coupled components in a single unitary package so that the unit is easily installed or removed.

The present invention achieves the above-stated objects by providing a hydrostatic actuator and a recirculating hydraulic actuator each driven by a low inertia, pneumatic gear motor wherein the components are closely coupled and are disposed within a single unitary package.

These and other objects, features and advantages of the present invention, as well as the preferred embodiment, will be more fully understood from the following description and drawings.

DESCRIPTION OF THE PREFERRED EMBODIMENT

Figure 1:
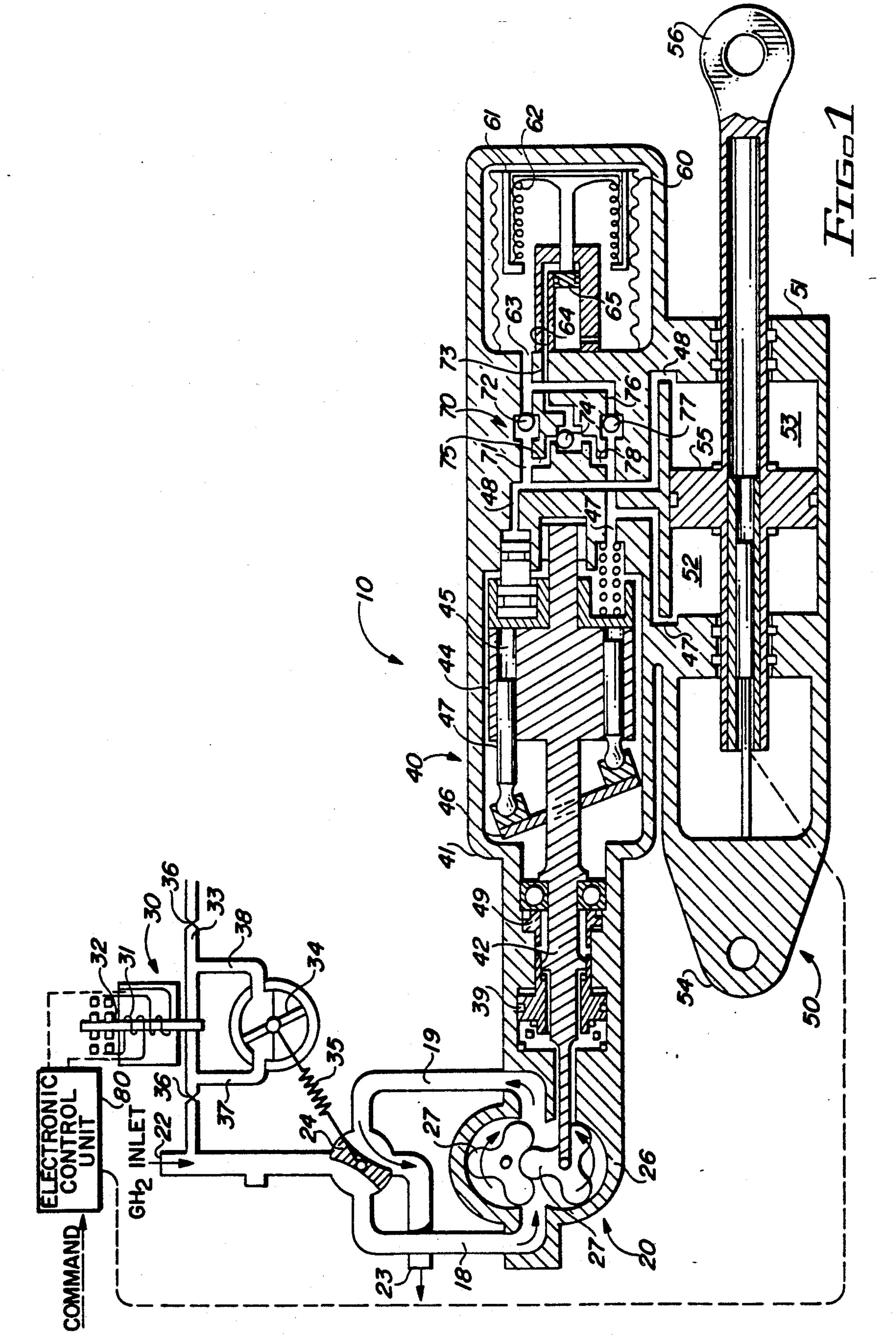
FIG. 1 is a schematic of a closely coupled pneumohydrostatic actuator constructed in accordance with the preferred embodiment of the present invention.
Figure 2:
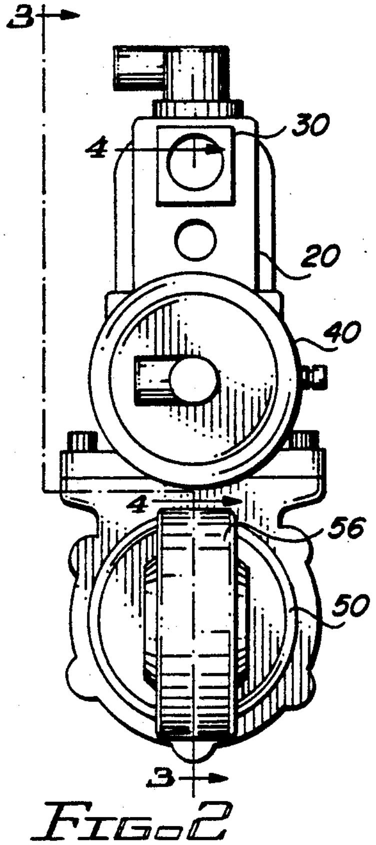
FIG. 2 is a front view of the closely coupled pneumohydrostatic actuator of FIG. 1.
Figure 4:
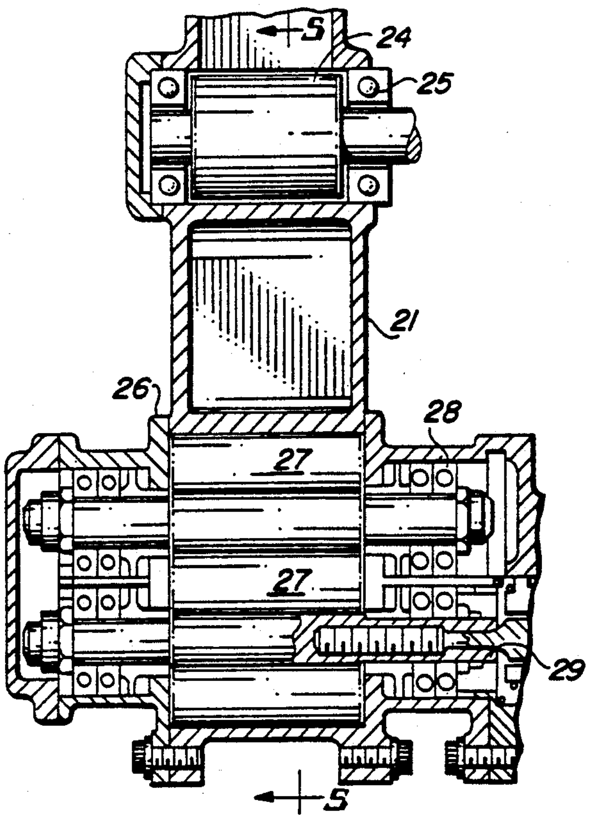
FIG. 4 is a cross-sectional view taken along line 4—4 of FIG. 2.

Referring to the drawings, FIGS. 1-5 show a pneumohydrostatic actuator generally indicated by the numeral 10. The pneumohydrostatic actuator 10 is comprised of a pneumatic gear motor assembly 20, a torque motor 30, a hydraulic pump 40, an actuator 50, a reservoir 60, an anti-cavitation system 70, and an electronic control unit 80.

The pneumatic gear motor assembly 20 has a housing 21 having a pneumatic inlet 22 and a pneumatic exhaust 23. A directional control valve 24 is rotatably supported in the housing 21 by a set of contact bearings 25, (see FIG. 4). Also, mounted within the housing 21 is a pneumatic gear motor 26 comprising two helical rotors 27 in self-timed engagement. The pneumatic gear motors, of the type used herein, have low inertias which allows them to be rapidly accelerated to operating speed. Each of the helical rotors 27 is supported by contact bearings 28 and can rotate both clockwise and counterclockwise. Also, each helical rotor 27 has a three lobed construction to eliminate output torque ripple. Two opposed conduits 18 and 19 fluidly couple the directional control valve 24 to the pneumatic gear motor 26. In operation, pressurized gas entering through the inlet 22 is directed, by the directional control valve 24 through one of the conduits 18 or 19 to the helical rotors 27 in which the pressure energy of the pressurized gas is extracted and converted into rotary motion of an output shaft 29, (see FIG. 4). The gas then passes to the exhaust 23 via the other of the conduits 18 or 19.

One particular application in which the pneumohydrostatic actuator 10 may be used is to provide pitch and yaw vectoring of the exhaust nozzle of a rocket that uses liquid hydrogen and liquid oxygen as fuel. In this application, the liquid hydrogen changes to gas when it is used to cool the rocket engine. The pressurized hydrogen gas is then used to drive the pneumatic gear motor 26. The temperature of the hydrogen gas can range from about −400° F. to 90° F. To avoid hydrogen embrittlement of the components of the gear motor assembly 20, the material for the housing 21, directional control valve 24, and the helical rotors 27, preferably has a face centered cubic crystal structure and can be selected from the following: Nitronic 60, Nickel based alloys 718 and 709; superalloys, cobalt based alloys HS25 and HS6B, Aluminum alloys, Copper alloys, Titanium alloys, Austentic stainless steels 304L and 316L, and stainless steel A286. However, the preferred material for these components is stainless steel A286. Also, the preferred material for the bearings 25 and 28 is stellite.

Figure 3:
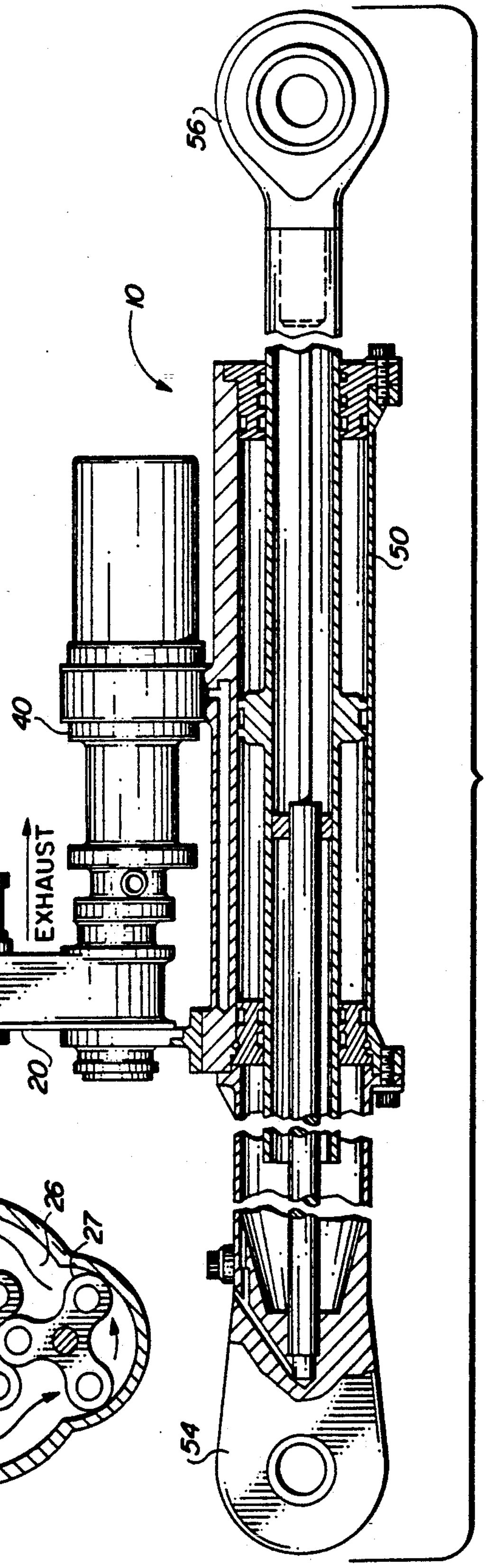
FIG. 3 is a side and partly cross-sectional view taken along line 3—3 of FIG. 2.
Figure 5:
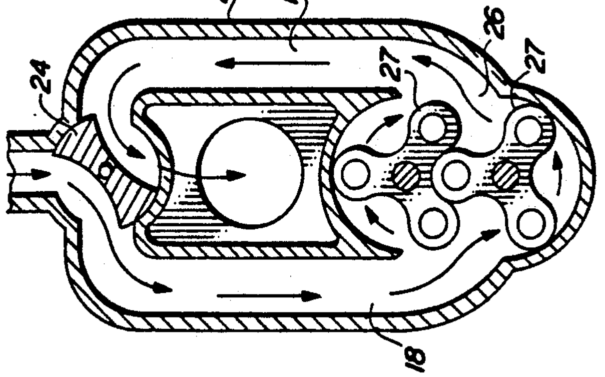
FIG. 5 is a cross-sectional view taken along line 5—5 of FIG. 4.

A torque motor 30 is mounted to the pneumatic, gear motor assembly 20, (see FIG. 3). The torque motor 30 has two electrically conducting coils 31 that when subjected to an electric current will cause the wand 32 to move. The degree of motion of the wand 32 is proportional to the magnitude of the electric current. The movement of the wand 32 proportionally block or unblocks the conduit 33. Conduit 33 fluidly communicates with a vane valve driver 34 via conduits 37 and 38. Two orifices 36 are operably disposed within the conduit 33 to control the flow of gas therein. The vane valve driver 34 can rotate over a +45 degree range and is coupled via a centering spring 35 to the directional control 24. When gas flows within the unblocked conduit 33 the gas pressure in conduits 37 and 38 is equal and the vane valve driver is at its pre-set position as shown in FIG. 1. As the wand 32 blocks the gas flow in conduit 33 the gas pressure in conduit 38 rises creating a pressure differential across the vane valve driver 34. In response to this pressure differential the vane valve driver will rotate thereby rotating the directional control valve 24. If the wand 32 is removed from conduit 33, the pressure differential disappears and the centering spring 35 will pull the vane valve driver 34 and the directional control valve 24 back to their pre-set position. The gas exiting conduit 33 (not shown) is returned to the inlet 22 upstream of the control valve 24.

A hydraulic pump 40 is provided. The pump 40 is a high speed, fixed displacement, rotating cylinder block type piston pump. The pump 40 is comprised of a housing 41 having a shaft 42 rotatably mounted therein. One end of the shaft 42 is coupled to the output shaft 29 of the pneumatic motor 26. The other end of the shaft 42 has a cylinder block 44 having a circular array of axial pumping chambers 45 for slideably receiving pistons 47. Only two of these chambers and pistons are shown in FIG. 1. A cam plate 46 is mounted on the heads of each piston 47 and causes the pistons 47 to reciprocate within the chambers 45 in response to rotation of the shaft 42. The bottom of each of the chambers 45 alternately opens into one of two conduits 47 and 48 through which hydraulic fluid flows. The shaft 42 has a plurality of static seals 39 and a rotary seal 49.

An actuator 50 is a linear output piston type actuator comprised of a housing 51 integral with the pump housing 41. The housing 51 is coupled at one end 54 to a supporting structure not shown. A piston 55 is slideably mounted within the housing 51 dividing the interior of the housing 51 into two chambers 52 and 53 of equal area. The chamber 52 is in fluid communication with the conduit 47 and the chamber 53 is in fluid communication with the conduit 48. A pressure differential between the chambers 52 and 53 will cause the piston 55 to move laterally relative to the housing 51. Coaxially mounted through the piston 55 is a hollow rod 56. One end of the rod 56 extends beyond the housing 51 and is coupled to the rocket nozzle or other member, (not shown), that is required to be moved. The rod 56 moves laterally in response to the lateral movement of the piston 55 and simultaneously moves the nozzle or member being acted upon. The lateral position of the rod 56 is monitored by a linear variable displacement transducer (LVDT) mounted thereon, which develops an electric signal indicative of the actuation status of the nozzle or other member.

A hydraulic fluid reservoir 60 is disposed within the pump housing 41. The reservoir 60 comprises a bellowed chamber 61 having a spring 62 counterbalancing a piston 65 upon which a pressure differential is acting. The reservoir 60 has an exit port 63 and an inlet port 64.

An anti-cavitation system 70 is disposed within the housing 41 between the reservoir 60 and the hydraulic pump 40 and is in fluid communication with both of these components. The system is comprised of a plurality of conduits and valves. The system prevents cavitation in both the actuator 50 and the pump 40. A conduit 71 connects conduit 48 with the exit port 63 and has a one-way check valve 72 that allows hydraulic fluid to flow only from the exit port 63 to the conduit 48. A conduit 73 connects the inlet port 64 to a shuttle valve 74. Connecting the shuttle valve 74 to conduit 71 is conduit 75. A conduit 76 connects conduit 47 to conduit 71 and has a one-way check valve 77 that allows hydraulic fluid to flow only from the exit port 63 to the conduit 47. A conduit 78 couples the conduit 76 to the shuttle valve 74. The shuttle valve 74 is a two-position valve that operates to open and close conduits 75 and 78.

To fully understand how this anti-cavitation system works it is best to look at a particular operating sequence Referring to FIG. 1, hydraulic fluid is being pumped through conduit 47 to the chamber 52 of the actuator 50 and returned from the chamber 53 through conduit 48. The pressure differential thereby created between the chambers 52 and 53 cause the rod 56 to extend. Simultaneously, the pressurized hydraulic fluid from the pump 40 flows through conduit 76 closing check valve 77 and also through conduit 78 opening the shuttle valve 74, closing conduit 75 and passing through conduit 73 to the inlet port 64 of the reservoir 60. Upon entering the reservoir 60 the hydraulic fluid moves the piston 63 laterally compressing the spring 62 and pressurizing the hydraulic fluid therein. When an external force acting on the piston rod 56 of the piston actuator 50 force it to extend faster than the hydraulic pump 40 can pump, the pressure of the hydraulic fluid will drop in chamber 52 and in conduits 47, 76, 78 and 73 and will increase in conduits 48, 71 and 75. When the pressure in the reservoir 60 and conduit 75 becomes greater than the pressure in conduit 78 the shuttle valve 74 will close conduit 7B and the check valve 77 will open. The spring 62 will then decompress and hydraulic fluid stored therein will flow from the exit port 63 through conduits 76 and 47 to the chamber 52 thereby preventing cavitation of the actuator 50.

An electronic control unit (ECU) 80, of the type well known in the art, is provided for coordinating the flow of pressurized gas to the pneumatic gear motor assembly 20 and torque motor 30 with the extension and retraction of the actuator rod 56. The ECU 80 also receives an electric signal from the LVDT and sends commands to the torque motor 30 to increase or decrease the amount of pressurized hydrogen gas entering the pneumatic motor assembly by opening or closing the directional control valve 24. The ECU 80 interfaces with the vehicles control system.

In operation, when movement of the rod 56 is not required, the pneumohydrostatic actuator 10 operates at a low power operating speed of about 10 rpm which is just sufficient to make up for leakage of hydraulic fluid in the system and does not generate large amounts of heat. When movement of the rod 56 is required, a command is sent from the vehicle to the ECU 80. The ECU 80 then commands the torque motor to position the directional control valve 24 depending on whether clockwise or counterclockwise rotation is required. The rotating of the valve 24 permits the pressurized gas to flow from its source in the vehicle to the pneumatic motor 6. With gas at a pressure of about 180 psi, the rotors 27 will accelerate to their operating speed of about 20,000 rpm in about 100 milliseconds. The rotors 27 simultaneously drive the hydraulic pump 40 which pumps hydraulic fluid to one of the chambers 52 or 53. The pressure differential between these chambers causes the piston 55 and the rod 56 to move laterally. The position of the rod is monitored by the LVDT which sends a signal back to the ECU 80. When the rod 56 has moved far enough to accomplish the necessary actuation, the ECU 80 sends a signal to the torque motor to partly close the valve 24 and the pneumohydrostatic actuator 10 returns to its low power operating condition.

FIG. 3 shows the components of the pneumohydrostatic actuator 10 in a closely coupled relationship to each other within a compact unitary package. The pneumatic motor 26 is mounted vertically on the actuator 50 resulting in a taller but narrower configuration. Alternatively, the pneumatic motor can be rotated about its output shaft 29 and the reservoir 60 can be packaged besides the pump 40 instead of at the end of the pump 40.

Figure 6:
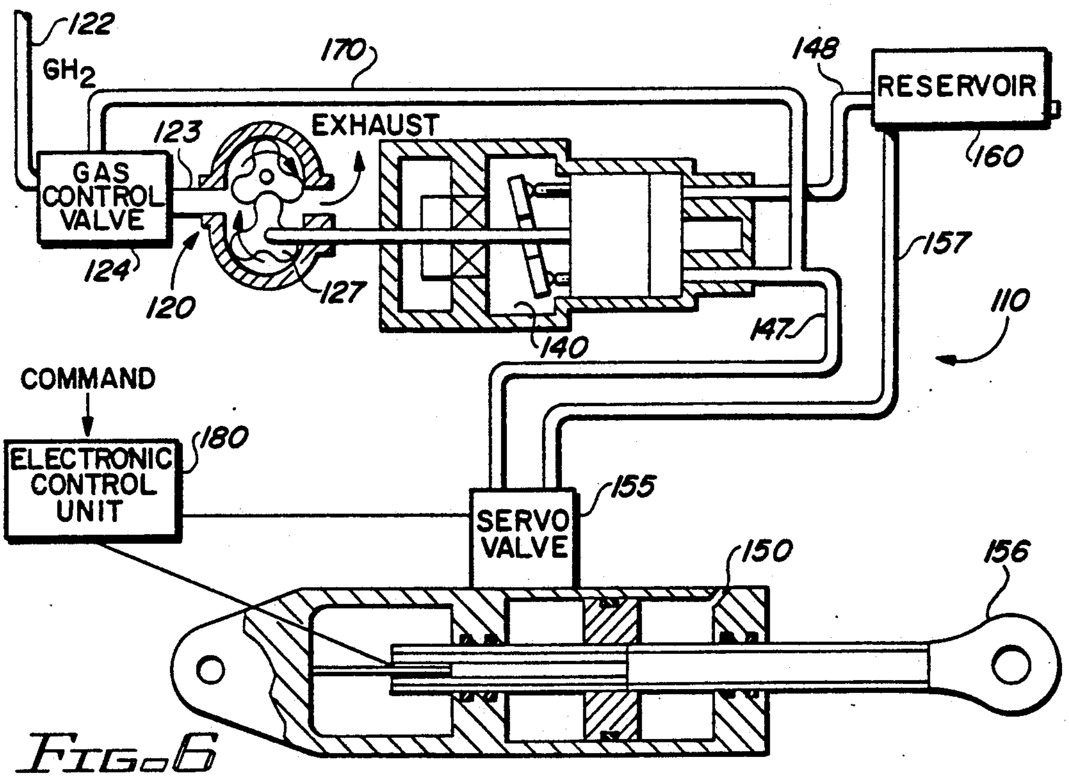
FIG. 6 is a schematic of a closely coupled pneumorecirculating hydraulic actuator which is constructed in accordance with the alternative embodiment of the present invention.

An alternative embodiment of the present invention is the pneumo-recirculating hydraulic actuator schematically illustrated in FIG. 6. The pneumo-recirculating hydraulic actuator 110 is comprised of a pneumatic gear motor assembly 120, a hydraulic pump 140, a piston actuator 150, a reservoir 160, an electronic control unit 180, and a hydraulic fluid conduit 170. Like the preferred embodiment, the components of the pneumo-recirculating hydraulic actuator 110 are in a close coupled relationship to each other. Many of the features of these components are the same as the features of the corresponding component in the pneumohydrostatic actuator 10 and therefore the detailed description of these components is not repeated here. Instead, the emphasis of the following description is on those features of the pneumo-recirculating hydraulic actuator 110 that are different from the pneumohydrostatic actuator 10.

Because the piston actuator 150 is controlled by a servo-valve 155, there is no need for the pneumatic gear motor assembly 120 to be reversible. Consequently, in the gear motor assembly 120 the directional control valve 24 is replaced by a hydraulically actuated unidirectional control valve 124 and is positioned downstream of the pneumatic inlet 122. A torque motor is no longer required to control the gas flow. Only a single conduit 123 runs from the valve 124 to the helical rotors 127. Also, if hydrogen gas is used as the operating fluid than the preferred materials for gear motor assembly 120 are the same as for the gear motor assembly 20.

The hydraulic pump 140 is the same as the hydraulic pump 40 except that conduit 147 runs from a piston chamber to the servo-valve 155 and the hydraulic fluid in this line always flows in this direction. Likewise, a conduit 148 runs from a piston chamber to the reservoir 160 which is structurally the same as the reservoir 60. The hydraulic fluid conduit 170 runs from conduit 147 back to control valve 124 and controls the opening and closing of the valve 24. The servo-valve 155 is disposed between the hydraulic pump 140 and the piston actuator 150. The piston actuator 150 being structurally the same as the piston actuator 150 and has a hollow rod 156. A conduit 157 runs from the servo-valve 155 to the reservoir 160. Anti-cavitation valves are not required. The ECU 180 is the same as the ECU 80, but controls the pneumo-recirculating actuator 110 by controlling the flow of hydraulic fluid through the servo-valve 155.

In operation, when movement of the arm 156 is not required the pneumo-recirculating actuator 110 operates at a low power setting of about 10 rpm to make up for leakage of hydraulic fluid. At this low power setting very little heat is generated. When the ECU 180 receives a command to move the actuator rod 156, it commands the servo-valve 155 to direct flow to the proper chamber in the actuator 150. The proper chamber depends on whether the rod 156 is to be extended or retracted. The servo-valve 155 opens causing the pressure in the conduits 147 and 170 to drop. The drop in pressure in the conduit 170 forces the control valve 124 to open allowing the high pressure hydrogen gas at about 180 psi to enter and expand across the helical rotors 127. The rotors 127 accelerate in about 100 milliseconds to full operating speed of about 20,000 rpm. The rotors 127 then drive the hydraulic pump 140 which in turn pumps hydraulic fluid into the conduit 147. The servo-valve 155 channels the hydraulic fluid from conduit 147 into the appropriate chamber in the piston actuator 160, thereby causing the rod 156 to extend or retract. A LVDT mounted on the rod 156 sends a signal to the ECU 180 and permits the ECU to monitor the lateral position of the rod 156. When the rod 156 has completed its movement, the ECU 180 sends a signal to the servo-valve 155 to shut off the flow to the piston actuator 160. Once the flow is shut off the pressure in lines 147 and 170 will rise. In response to this pressure rise, the control valve 124 closes down and reduces the flow of pressurized gas to the gear motor 126. The gear motor 126 returns to its low power operating point.

A method is also provided for actuating a member on an aircraft or a rocket having an on board source of pressurized gas. The first step in this method is to couple a pneumatic motor to a hydraulic pump that is fluidly coupled to a piston actuator having an actuator arm extending therefrom. The actuator arm is then coupled to the member of the rocket or aircraft that requires actuation. High pressure gas, stored aboard the vehicle, is brought from it storage compartment to the pneumatic motor. The pneumatic motor extracts the pressure energy of the gas and converts this energy into rotary motion. This rotary motion drives the hydraulic pump which in turn pumps hydraulic fluid to the piston actuator causing the actuator arm to laterally move and thereby move the member requiring actuation.

Accordingly, the foregoing portion of the description, which includes the accompanying drawings, is not intended to restrict the scope of the invention to the illustrated embodiments or to specific details which are ancillary to the teaching contained herein. The invention should be construed in the broadest manner which is consistent with the following claims.

What is claimed is:

1. A pneumohydrostatic actuator for use aboard an aircraft or rocket having a source of pressurized gas comprising in combination:

a reversible, pneumatic motor having a low inertia in fluid communication with said source of pressurized gas, said pneumatic motor including a housing having a pneumatic inlet and a pneumatic exhaust; a directional control valve rotatably supported in said housing by a first set of contact bearings and positioned downstream of said pneumatic inlet; and at least one helical rotor supported in said housing by a second set of contact bearings and operably positioned between said directional control and said pneumatic exhaust;

a reversible, hydraulic pump drivingly coupled, to said pneumatic motor and having at least two conduits through which hydraulic fluid is alternatively pumped and returned; and an actuator in fluid communication with said conduits and including an extending, retractable rod coupled to a member of said aircraft or rocket requiring actuation.

2. The pneumohydrostatic actuator of claim 1 further comprising a hydraulic fluid reservoir and an anti-cavitation system disposed between and in fluid communication with said reservoir and said fluid conduits.

3. The pneumohydrostatic actuator of claim 1 wherein said helical rotors are in self-timed engagement.

4. The pneumohydrostatic actuator of claim 3 wherein said helical rotors have a three lobe configuration.

5. The pneumohydrostatic actuator of claim 1 wherein the materials for the pneumatic motor are selected to be compatible with hydrogen gas.

6. The pneumohydrostatic actuator of claim 5 wherein said materials are selected to avoid hydrogen embrittlement.

7. The pneumohydrostatic actuator of claim 6 wherein said material for said first and second sets of contact bearings is stellite.

8. The pneumohydrostatic actuator of claim 6 wherein said material for said housing, said directional control valve and said helical rotor has a face centered cubic crystal structure.

9. The pneumohydrostatic actuator of claim 8 wherein said material for said housing, said directional control valve, and said helical rotor is selected from the group consisting of Nitronic 60, Nickel based alloys 718 and 909, Superalloys, Cobalt based alloys HS25 and HS6B, Aluminum alloys, Copper alloys, Titanium alloys, Austenitic stainless steels 304L and 316L, and stainless steel A286.

10. The pneumohydrostatic actuator of claim 9 wherein said material for said housing, said directional control valve, and said helical rotor is stainless steel A286.

11. The pneumohydrostatic actuator of claim 1 wherein said hydraulic pump is a high speed, fixed displacement piston pump.

12. The pneumohydrostatic actuator of claim 11 wherein said hydraulic pump has a pump shaft having a rotary and static seal.

13. The pneumohydrostatic actuator of claim 1 further comprising a torque motor and a pneumatic vane valve driver coupled to said directional control valve, said vane valve driver being controlled by said torque motor.

14. The pneumohydrostatic actuator of claim 1 wherein said pneumatic motor, said hydraulic pump and said actuator are in a closely coupled relationship.

15. A pneumo-recirculating hydraulic actuator comprising in combination:

a low inertia pneumatic motor having a hydraulically operated pneumatic control valve;

a hydraulic pump drivingly coupled, at a first end, to said pneumatic motor and having at a second end a first conduit through which hydraulic fluid is suctioned and a second conduit through which hydraulic fluid is pumped, said second conduit coupled to a third conduit through which hydraulic fluid is brought to said hydraulically operated pneumatic control valve;

a piston actuator having a rod that extends and retracts therefrom;

a reservoir coupled to said first conduit and having a fourth conduit; and a servo-valve coupled to said second and fourth conduits and to said piston actuator for controlling the flow of hydraulic fluid therebetween.

16. The pneumo-recirculating hydraulic actuator of claim 15 wherein said pneumatic motor further comprises;

a housing having a pneumatic inlet and a pneumatic exhaust;

a control valve rotably supported in said housing and positioned downstream of said pneumatic inlet; and at least one helical rotor supported in said housing and positioned between said control valve and said pneumatic exhaust.

17. The pneumo-recirculating hydraulic actuator of claim 16 wherein said helical rotors are in self-timed engagement.

18. The pneumo-recirculating hydraulic actuator of claim 17 wherein said helical rotors has a three lobe configuration.

19. The pneumo-recirculating hydraulic actuator of claim 16 wherein the materials for the pneumatic motor are selected to be compatible with hydrogen.

20. The pneumo-recirculating hydraulic actuator of claim 19 wherein said materials are selected to avoid hydrogen embrittlement.

21. The pneumo-recirculating hydraulic actuator of claim 20 wherein said material for said housing, said control valve and said helical rotor has a face centered cubic crystal structure.

22. The pneumo-recirculating hydraulic actuator of claim 21 wherein said material for said housing, said directional control valve, and said helical rotor is selected from a group consisting of Nitronic 60, Nickel based alloys 718 and 909, Superalloys, Cobalt based alloys HS25 and HS6B, Aluminum alloys, Copper alloys, Titanium alloys, Austenitic stainless steels 304L and 316L, and stainless steel A286.

23. The pneumo-recirculating hydraulic actuator of claim 22 wherein said material for said housing, said control valve, and said helical rotor is stainless steel 24. The pneumo-recirculating hydraulic actuator of claim 15 wherein said hydraulic pump is a high speed, fixed displacement piston type pump.

25. The pneumo-recirculating hydraulic actuator of claim 15 wherein said hydraulic pump has a pump shaft having a rotary and static seal.

26. A pneumo-recirculating hydraulic actuator comprising in combination:

a low inertia means for converting the kinetic energy of pressurized gas to rotary motion;

a hydraulic pump driven by said rotary motion and having a first conduit through which hydraulic fluid is returned and a second conduit through which hydraulic fluid is pumped;

a piston actuator having a rod that extends and retracts therefrom;

a reservoir coupled to said first conduit and having a third conduit;

a servo-valve for controlling the flow of hydraulic fluid between said second and third conduits and said piston actuator; and means for using the pressure of the hydraulic fluid in said second conduit to control the flow of said gas to said low inertia means.

* * * * *